UNITED STATES PATENT OFFICE.

GEORGE W. MASON, OF SHARON, PENNSYLVANIA.

ARTIFICIAL STONE.

SPECIFICATION forming part of Letters Patent No. 240,742, dated April 26, 1881.

Application filed March 7, 1881. (No specimens.)

*To all whom it may concern:*

Be it known that I, GEORGE W. MASON, of Sharon, Mercer county, Pennsylvania, have invented a new and Improved Artificial Stone, of which the following is a specification.

My improved composition of matter for making artificial stone consists of the following ingredients combined in the proportions stated, viz: ninety gallons of gas-tar boiled to a good pitch, and cement, four gallons; plaster-of-paris, one gallon; lime, one gallon; ground cinders, two gallons; ground ore, one gallon; ground oyster-shells, four gallons; fine ashes, one gallon; pulverized dry clay, one bushel; dry sawdust, one bushel; ground slate, one-half bushel; ground stone, one bushel; sand and pebbles, six bushels; melted brimstone, five gallons. Ninety gallons of gas-tar are boiled until they are a good hard pitch, and this pitch is mixed with the above-mentioned ingredients, which have been heated in suitable vessels. These ingredients, with the exception of the brimstone, are formed into a good stiff mortar with the pitch, and then the five gallons of melted brimstone are added. While hot the entire mass is spread in suitable molds of wood or metal to form stones of the desired size and shape. When cold this mass forms a very hard but nevertheless elastic mass, which is not affected by heat, cold, or moisture.

The color of this stone is plain black; but it will have a slate color if planed.

I prefer to use Rosedale or Portland cement, but may use any kind of building-cement or water-lime cement.

The above-described mass can be used for making paving-stones, cisterns, tiles, drains, pipe, water-tanks, cellar-slabs, &c.

Having thus described my invention, I claim as new and desire to secure by Letters Patent—

The herein-described composition of matter to be used for making artificial stone, and consisting of pitch made from gas-tar, cement, plaster-of-paris, lime, ground cinders, ground ore, ground oyster-shells, fine ashes, pulverized dry clay, dry sawdust, ground slate, ground stone, sand and pebbles, and molten brimstone, in the proportions specified.

GEORGE WASHINGTON MASON.

Witnesses:
 JAMES MCCAMANT,
 SALEM HEILMAN.